United States Patent [19]

Philp

[11] Patent Number: 4,488,883
[45] Date of Patent: Dec. 18, 1984

[54] VACUUM BAG CLEANING SYSTEM

[76] Inventor: Joseph T. Philp, 145 Gailmor Dr., Yonkers, N.Y. 10710

[21] Appl. No.: 582,920

[22] Filed: Feb. 23, 1984

[51] Int. Cl.³ .............................................. B01D 46/42
[52] U.S. Cl. .................... 55/311; 55/341 R; 55/350; 55/372; 55/378; 55/467
[58] Field of Search ................. 55/319, 350, 309–311, 55/363, 372, 378, 467, 472, 341 R; 15/327 F, 327 R

[56] References Cited

U.S. PATENT DOCUMENTS

| 913,966 | 3/1909 | Mohr | 55/472 |
|---|---|---|---|
| 1,100,575 | 6/1914 | Kirby | 55/311 |
| 2,025,946 | 12/1935 | Wenner-Gren | 15/327 F |
| 3,002,215 | 10/1961 | MacFarland | 15/327 |
| 3,422,482 | 1/1969 | Hamrick | 15/327 F |
| 3,568,413 | 3/1971 | Jerabek | 55/379 |
| 4,072,483 | 2/1978 | Doyle | 55/372 |

*Primary Examiner*—Bernard Nozick
*Attorney, Agent, or Firm*—Lackenbach, Siegel, Marzullo, Presta & Aronson

[57] ABSTRACT

A vacuum cleaner bag cleaning system that provides a receptacle compartment having a removable top wall having a cylindrical cleaning member extending through it into the compartment for holding an inverted cloth vacuum bag. An exhaust fan motor unit also is positioned at the top wall and draws air through the cleaning member and through the cloth pores of the bag, thus forcing out entrapped particles of dirt and general debris caught in the bag and further drawing the air from the compartment and exhausting it to the atmosphere.

14 Claims, 7 Drawing Figures

U.S. Patent  Dec. 18, 1984  Sheet 3 of 3  4,488,883
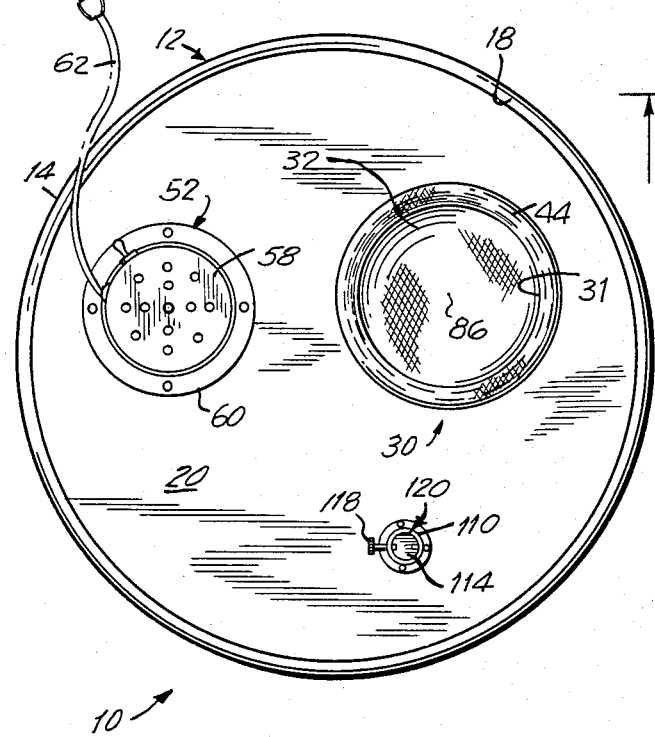
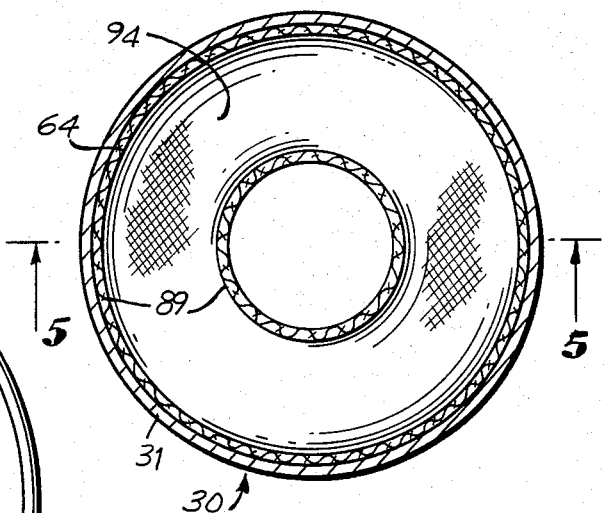
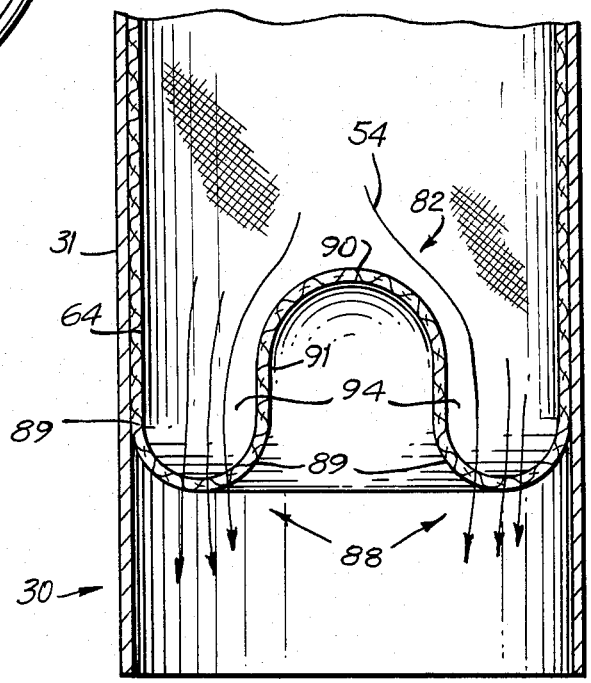

VACUUM BAG CLEANING SYSTEM

The present invention relates to vacuum cleaner bags and in particular to cleaning industrial cloth vacuum cleaner bags.

BACKGROUND OF THE INVENTION

Vacuum cleaner bags after normal use are inverted and emptied of their contents into a trash receptacle and then are replaced in connection with their vacuum fan/motors and placed into operation again. The efficiency of a typical cloth bag, however, is continuously impaired as the pores of the cloth wall of the bag become clogged with particles of dust, dirt, debris, and other bodies. At present, a vacuum cleaner bag can be cleaned after each use by hand, which is a generally unsatisfactory procedure. Unsatisfactory or incomplete cleaning of the cloth vacuum cleaner bags results in backup of air and general air pollution in the area of use; reduction of operating efficiency of the vacuum cleaner; energy waste; and excessive labor for using excessive time to complete vacuuming tasks.

Vacuum cleaner bag cleaning apparatus are known. One such device is described in U.S. Pat. No. 1,864,622 granted to A. W. Sutherland June 28, 1932. Here, a vacuum cleaner bag is suspended in a compartment and air is sent into the bag. This device is cumbersome and time-consuming to mount and demount. In addition, the air pressure is not directed to particularly debris-laden areas. Also, the air pressure cannot be concentrated at the debris-laden areas.

Another vacuum bag cleaning device is described in U.S. Pat. No. 1,104,668 granted July 21, 1914 to W. H. Herbst. This device describes a tubular suction member connected to an exhaust fan with a tubular or cylindrical wire seen positioned in the tubular suction member spaced from the wall of the tubular suction member. A vacuum bag placed at the front of the suction member is drawn inside out into the cylindrical screen and sucked clean. This device distributes air equally over all of the long surface of the bag at the same time and does not concentrate the air flow for concentrated cleaning. The wire screen is cumbersome.

Yet another cleaning device is described in U.S. Pat. No. 3,653,189 issued to Yuji Miyake et al. Apr. 4, 1972. Here, a two-stage filtering system is entirely enclosed in a detachable dust collecting case. As described on page 9, lines 32-44, the dust collecting case is detached from its housing and put in an upright position. A vibrator then operates to vibrate the cloth filter so that the dust particles fall down toward the bottom of the case. It is apparent that vibrator 350 is cumbersome. In addition, no air pressure is used to blow the bag clean of dirt.

Other prior art cleaning devices generally related to the field are as follows: U.S. Pat. No. 2,333,713 issued to M. A. Eiken, Nov. 9, 1943; U.S. Pat. No. 2,260,449 issued to H. I. Goldwyn Oct. 28, 1941; U.S. Pat. No. 1,748,775 issued to J. W. Kittridge Feb. 25, 1930; U.S. Pat. No. 1,437,025 issued to A. E. Schulz Nov. 28, 1922; and U.S. Pat. No. 3,320,725 issued to J. R. Foster May 23, 1967.

Accordingly, it is an object of the present invention to provide a vacuum bag cleaning system that eliminates cleaning vacuum cleaner bags by hand and instead provides a vacuum exhausted compartment into which a cloth vacuum cleaner bag is placed and dirt encrusted on the bag is blown from the pores of the bag by a concentrated current of air. It is another object of this invention to provide a vacuum bag cleaning system that draws exhaust air through a toroidal ring formed around the circumferential portion of a vacuum cleaner bag at selected positions in a cleaning chamber so as to blow out dirt from the pores of the bag.

It is yet a further object of this invention to provide a system for blowing air through the pores of a vacuum cleaner bag that is invertedly mounted in a cleaning chamber that in turn extends into a vacuum compartment into which air is drawn by a suction fan and motor through the cleaning chamber and bag.

It is still another object of this invention to provide a vacuum bag cleaning system that allows an operator to selectively concentrate air flows into selected toroidal rings of the vacuum cleaner bag so that dirt and debris are blown from the bag and are collected at the bottom of the vacuum receptacle compartment in which the bag is inversely positioned.

In accordance with these and other objects, there is provided a vacuum bag cleaning system including a substantially rigid receptacle member having a continuously substantially vertical side wall and a substantially horizontal bottom wall sealably secured to the side wall, the side wall having a top rim. The receptacle member is preferably cylindrical with a circular top rim. A substantially horizontal top chassis wall opposing the bottom wall is removably and sealably secured to the top rim of the receptacle member. The top wall forms first and second apertures. The side wall, bottom wall, and the top wall define a preferably cylindrical receptacle compartment. An elongated cylindrical member forming a cylindrical cleaning chamber extends vertically into the compartment. The cylindrical member has upper and lower portions that respectively extend above and below the top wall. The cleaning chamber has opposed top and bottom openings at the upper and lower portions respectively, with the bottom opening spaced from the bottom wall of the receptacle member. The top opening is defined by a top opening rim. The cleaning chamber is sealably connected to the top wall at the juncture of the upper and lower portions. The cylindrical cleaning chamber has a substantially vertical axis. An exhaust fan operatively connected to an electric motor is sealably mounted with the top wall at the second aperture. The exhaust fan is adapted to draw air from the receptacle compartment through the top opening of the cleaning chamber and to exhaust the air through the second aperture into the atmosphere. A vacuum cleaner bag member with a flexible cloth wall permeable to the passage of air forms an elongated compartment having a length and having an open end and a closed end at opposed ends of the length, the open end being defined by a circular holding rim adapted to be removably and sealably placed around the top rim of the chamber in a mounted relationship. The cloth wall of the bag member has normal inner and outer surfaces. The bag member is movable in the mounted relationship to a plurality of selected positions in the cleaning chamber between a downward position and an upward position. In the downward position the bag member is fully extended to its length downward in the cleaning chamber with the inner surface inverted to assume an outward orientation and the closed end of the bag member and the bottom opening of the cleaning chamber are in proximate relationship. The bag member is substantially circular in cross-section with a center substantially aligned with the vertical axis of the cleaning chamber.

The upward position is wherein the bag member is fully extended upward with the closed end of the bag member spaced to the length of the bag member above the top opening of the cleaning chamber. In each of the plurality of selected positions the flexible wall of the bag member forms a substantially horizontal toroidal ring around the circumferential portion of the bag member substantially centered on the vertical axis of the cleaning chamber. The toroidal ring has a toroidal wall portion disposed downwardly forming an upwardly disposed toroidal recess, so that air being drawn into the top opening of the chamber by the exhaust fan is concentractedly drawn through the toroidal wall portion at the plurality of selected positions. Filters are placed around the inlet side of the fan housing to protect the fan and motor from dirt. A safety aperture is formed in the top wall for passing air into the compartment and relieving excess pressure on the side wall of the receptacle member.

At this point I would like to mention that my invention does not necessarily solve all the problems of cleaning a vacuum cleaner bag. For example, hair-type wastes captured by the bag, particularly along seam areas, are particularly difficult to extract, and for this problem occasional cleaning with a hand-held tool may be necessary.

The present invention will be better understood and the main objects and important features will become apparent when consideration is given to the following details and description, which, when taken in conjunction with the annexed drawings, describes, discloses, illustrates, and shows the preferred embodiments or modifications of the present invention and what is presently considered and believed to be the best mode of practice in the principles thereof. Other embodiments or modifications may be suggested to those having the benefit of the teachings herein and such other embodiments or modifications are intended to be reserved especially as they fall within the scope and spirit of the subjoined claims.

BRIEF DESCRIPTION OF THE DRAWINGS

The invention will be more closely understood from the following invention of a specific embodiment of the invention, together with the accompanying drawings, wherein similar reference characters denote similar elements throughout the several views, and in which:

FIG. 3 is a top view of the invention;

FIG. 4 is a view taken through line 4—4 of FIG. 2 showing the toroidal ring formed by the vacuum bag;

FIG. 5 is a view taken through line 5—5 of FIG. 4;

DESCRIPTION OF THE PREFERRED EMBODIMENTS

Reference is now made in detail to the drawings. A vacuum bag cleaning system 10 is shown in a perspective view in FIG. 1. As shown therein, a substantially rigid receptacle member 12 has a continuous, substantially vertical side wall 14, which, as shown, is preferably cylindrical.

Figure 1:
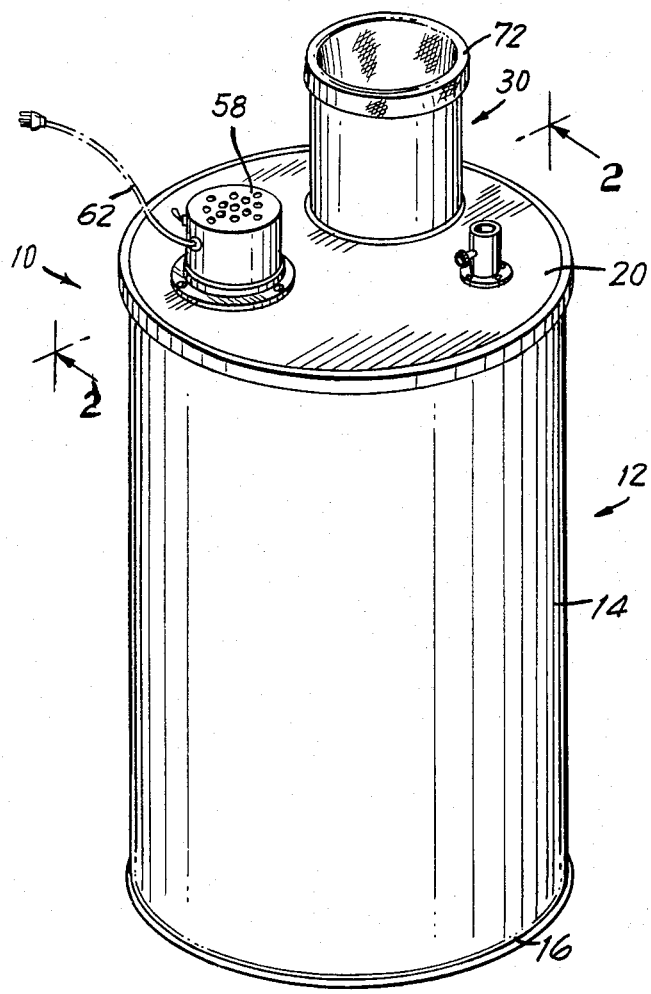
FIG. 1 is a perspective view of the vacuum bag cleaning system according to the present invention.
Figure 2:
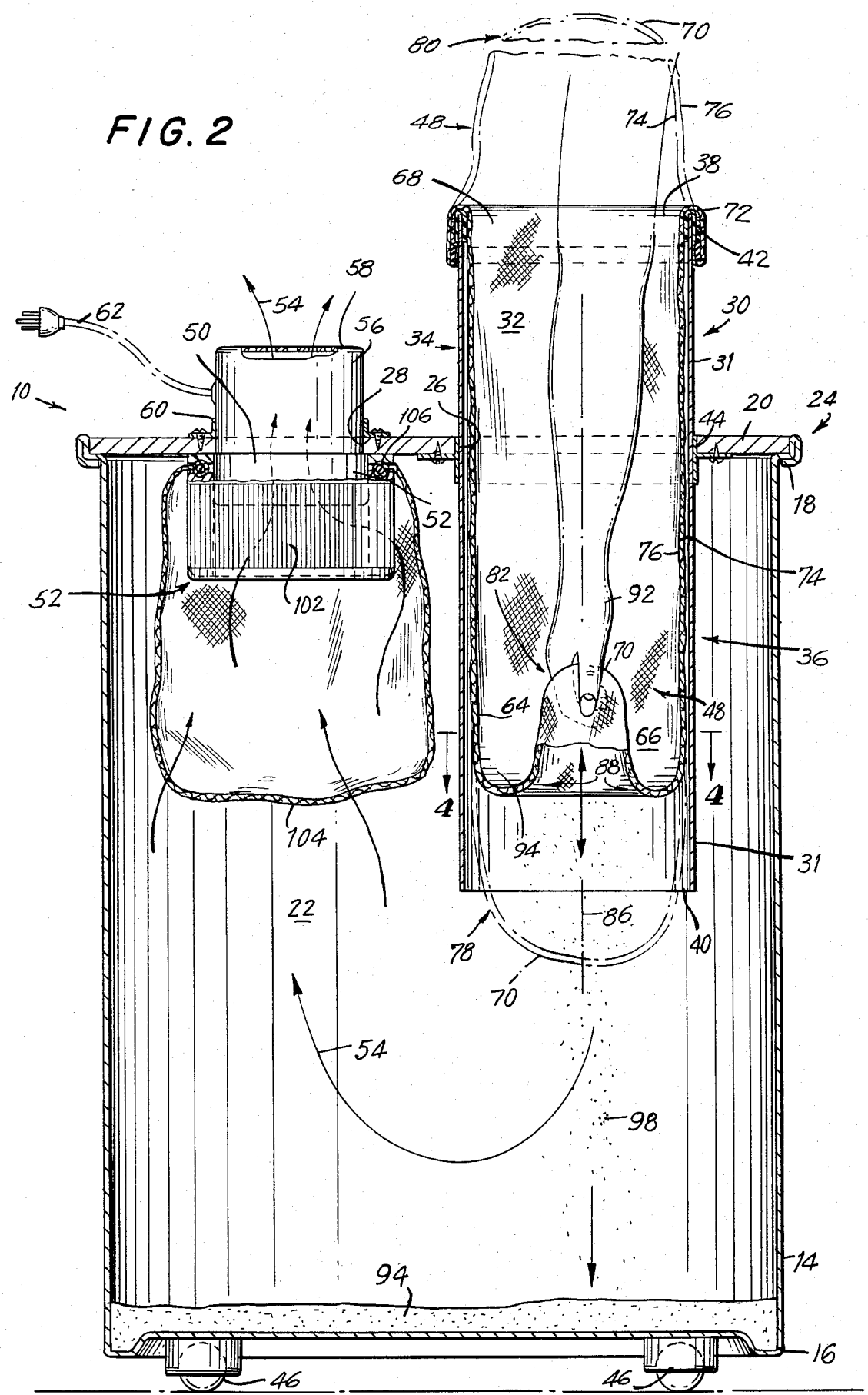
FIG. 2 is a side sectional view taken through line 2—2 of FIG. 1.

As shown in FIG. 2, a horizontal bottom wall 16 is sealably secured to side wall 14, preferably by being cast or molded unitarily with side wall 14. Receptacle member 12 can be made of heavy plastic. Side wall 14 forms a preferably circular top rim 18. A horizontal cylindrical chassis top, or top wall, 20 opposing bottom wall 16 is shown in FIGS. 1 and 2 removably and sealably secured to top rim 18 of receptacle member 12. Side wall 14, bottom wall 16, and top wall 20 define a preferably cylindrical receptacle comparment 22. Side wall 14 forms a circumferential support 18 extending outwardly around top rim 18; support 18 preferably includes a circumferentially horizontally extending ledge having a vertical upwardly extending lip that is adapted to hold the rim of top wall 20 in position.

Top wall 20 forms first and second apertures 26 and 28 seen in FIG. 2 and generally indicated in FIGS. 1 and 3 as will be described. An elongated rigid cylindrical cleaning member 30 having a cylindrical side wall 31 forming a cylindrical cleaning chamber 32 vertically extends through first aperture 26 into receptacle compartment 22. Cleaning member 30 has upper and lower portions 34 and 36, respectively, extending above and below top wall 20, respectively. Chamber 32 has opposed top and bottom openings 38 and 40 respectively. Bottom opening 40 is spaced from bottom wall 16 of receptacle member 12. Top opening 38 is defined by a circular top opening 42. Cylindrical cleaning member 30 is sealably connected to top wall 20 at the juncture of upper and lower portions 34 and 36 by a circumferential flange 44 that is preferably attached to cylindrical side wall 31 and to top wall 20 by pop rivets when top wall 20 and cleaning member 30 are made of metal as shown in the embodiment of FIGS. 1-6. When the system is made of heavy plastic, heat bonding or unitary casting are the preferred methods of attachment.

At this point, a few comments will be made regarding the general sizing of system 10, particularly of receptacle members 12 and cleaning member 30. Receptacle member 12 can be, for example, a 55-gallon steel drum devoid of a top wall; receptacle member 12 in this configuration would have a diameter of about 22¾ inches. Another configuration of receptacle member 12 is a 44 mobile garbage receptacle on wheels (shown in FIG. 2 in phantom lines as wheels 46). In this last configuration, the diameter of receptacle member 12 would be about 24 inches. The mobile garbage receptacle would be made of heavy plastic or synthetic rubber. A trade model would be a Rubber Maid Model No. 44 Mobile Brute. Cleaning member 30 preferably has an 8 inch diameter and is 24 inches in length. Cleaning member 30 is preferably made of the same or similar material as receptacle member 12 and its side wall 31 is of sufficient thickness to withstand the changing air pressures and mechanical stress it will be subject to, as will be explained below. One suggested material is a galvanized metal such as a smoke pipe. The length and diameter, however, of cleaning member 30 may vary. Cleaning member 30 is preferably mounted through first aperture 26 of top wall 20 about 4 inches from top rim 18. Upper portion 34 preferably is one-third the length of cleaning member 30 and lower portion 36 preferably is two-thirds the length of cleaning member 30. Thus, when cleaning member 30 is 24 inches in length, upper portion 34 is 8 inches and lower portion 36 is 16 inches. In some cases, cleaning member 30 would be 30 inches in length, upper portion 34 would be 10 inches, and lower portion 36 would be 20 inches. As will be discussed below, the length of cleaning member 30 is in accordance with the length of a vacuum bag 48 positioned in cleaning chamber 32; that is, certain standard industrial vacuum bags are 24 inches in length and others are 30 inches in length. Other lengths are possible within the spirit of the invention.

An exhaust fan 50 is mounted in a fan housing 52, which is positioned in second aperture 28 in top wall 20. Exhaust fan 50 is a centrifugal suction fan drawing air upwardly from receptacle compartment 22 and ejecting the air into the atmosphere. The general path of the exhaust air is shown by a dotted line with arrows and designated by the numeral 54. A fan driver, preferably an electrical motor 56 is mounted in a motor housing 58 set over fan housing 52. Motor housing 58 is sealably secured to top wall 20 by means of a mounting adapter 60. An electrical conductor 62 connects motor 56 with a source of electrical power. An electrical power switch 64 for motor 56 is shown in FIG. 3. Motor 56 is a vacuum cleaner motor compatible with the vacuum cleaner bag 48 to be cleaned. A typical motor would be a Lamb-/Ametek vacuum cleaner motor model No. 11-6309.

Vacuum bag 48 is a typical vacuum cleaner bag, here preferably an industrial type bag, with a flexible cloth wall 64 having pores that make cloth wall 64 permeable to the passage of air but not of particles of dust, dirt, and debris. Bag 48 has a length, generally, as noted above either about 24 or about 30 inches. Cloth wall 64 forms a compartment 66 elongated along the lengthwise orientation of bag 48 having an open end 68 and a closed end 70 at opposed ends of the lengthwise measurement. Open end 68 is defined by a circular holding rim 72 that is adapted to be removably and sealably placed around top opening rim 42 of cleaning member 30 in a mounted relationship as seen in FIG. 2. Cloth wall 64 has normal inner and outer surfaces 74 and 76 so orientated during normal vacuuming operation.

In accordance with the present invention, bag 48 is hung at top opening rim 42 of cleaning member 30 hung in an inverted configuration inside cleaning chamber 32 wherein in the fully hung position shown as downward position 78 in FIG. 2 cloth wall 64 lies in longitudinal abutment with cylindrical side wall 31 of cleaning member 30 so that no space is formed at any place between them. That is, cloth wall 64 forms a longitudinal cylinder having an outer cylindrical diameter that is approximately equal to the inner cylindrical diameter of cylindrical side wall 31. It is noted that cloth wall 64 can, of course, droop, but under air pressure it has a stiffened configuration and its cylindrical diameter referred to above is in its stiffened configuration.

At this point, it is worth mentioning that vacuum bag 48 shown in FIGS. 2, 4 and 5 do not indicate that the opposite end of the bag from holding rim 72 is normally slightly open for passage of air during operation of the vacuum cleaner. This opening will be closed by mechanical means or by gripping action of the user during the cleaning operation. In the drawings, however, this opening is shown closed in order to better illustrate the feature and operation of the invention.

Bag member 48 is movable to a plurality of related positions in cleaning chamber 32 in its mounted relationship with cleaning member 30, that is, when holding rim 72 is placed around top opening rim 42. The plurality of selected positions are between the downward position 78 and an upward position 80, both shown in phantom lines in FIG. 2. The plurality of selected positions are indicated by a single representation designated by numeral 82 in FIG. 2. Downward position 78 is wherein bag member 48 is fully extended downward in cleaning chamber 32 with inner surface 74 inverted to assume an outward orientation and outer surface 76 likewise inverted to assume an inward position. The normal operating orientation of inward and outward surfaces 74 and 76 are seen in upward position 80 of vacuum bag member 48. In downward position 78 noted above, closed end 70 of bag member 48 is in proximate relationship with bottom opening 40 of cleaning chamber 32. It is not necessary that closed end 70 and bottom opening 40 be exactly horizontally aligned but only sufficiently aligned so that bag member 48 is kept vertically aligned by cleaning member 30 during bag cleaning operations. As seen in FIG. 4, bag member 48 is substantially circular in cross-section with a center 84 that is substantially aligned with the vertical axis 86 of cylindrical cleaning chamber 32. In the preferred embodiment, cylindrical side wall 31 of cleaning member 30 generally abuts on cloth wall 64 of bag member 48 in the downward position. Bag member 48 is not exactly cylindrical as cleaning member 30, so that there is a slight spacing between side wall 31 and cloth wall 64 at the bottom portions of cleaning member 30 and bag member 48 in the downward position so that there is not a full abutment between the two in this area.

In upward position 80, noted above, bag member 48 is fully extended upward with closed end 70 spaced to the length of bag member 48 above top opening 38 of cleaning member 30. In upward position 80, bag member 48 is oriented as it would be during normal vacuum operations with inner surface 74 oriented inwardly and outer surface 76 oriented outwardly.

In each of the plurality of selected positions 82, flexible wall 64 of bag member 48 forms a substantially horizontally disposed ring around the circumferential portion of bag member 48 that is generally configured as a half-toroid and will be designated here as toroidal ring 88, which is substantially centered on vertical axis 30 of cleaning member 30, that is, of cleaning chamber 32. Toroidal ring 88 has a toroidal wall portion 89 disposed downwardly with one upward portion being a continuation of the outer vertical wall portion of flexible wall 64 and another upward toroidal portion disposed upwardly towards a curved hump, or crown, 90 that is gripped by the hand 92 of a user during the vertical positioning process.

In the preferred embodiment, cylindrical side wall 31 of cleaning member 30 generally abuts on cloth wall 64 of bag member 48 in the downward position. Bag member 48 is not exactly cylindrical as cleaning member 30 so that there is slight spacing between side wall 31 and cloth wall 64 at the bottom portions of cleaning member 30 and bag member 48 in the downward position so that there is not a full abutment between the two in this area.

In upward position 80, noted above, bag member 48 is fully extended upward with closed end 70 spaced to the length of bag member 48 above top opening 38 of cleaning member 30. In upward position 80, bag member 48 is oriented as it would be during normal vacuum operations with inner surface 74 oriented inwardly and outer surface 76 oriented outwardly. Wall portion 89 forms an upwardly disposed toroidal recess 94, which is semi-circular in cross-section and is capable of receiving and passing air 54 drawn into top opening 38 of cleaning chamber 32 by exhaust fan 50. Air 96 is concentrated at toroidal ring 88 since it passes around curved crown 90 without passing through cloth wall 64 at that area and is directed to the much smaller area at toroidal recess 94. The increased air pressure at toroidal ring 88 caused by the concentration of air 54 causes particles of dirt 98 encrusted on or clinging to inner surface 74 to be blown into receptacle compartment 22 where they accumulate at bottom wall 16 as accumulated debris 99. Dirt particles 98 that are blown about compartment 22 that are drawn toward fan 50 are captured before being passed into fan 50 or motor 56 in the following manner. Fan housing 52 has an inlet portion 100 around which is slide-on or friction mounted folded paper filter cartridge 102. In addition, a nylon dirt shedding filter 104 having an exhaust opening and an elasticized band 106 positioned around the exhaust opening is snap-mounted around filter-cartridge 102 at band 106. Dirt particles 98 are thus removed from exhaust air 54 before reaching motor 56.

Figure 6:
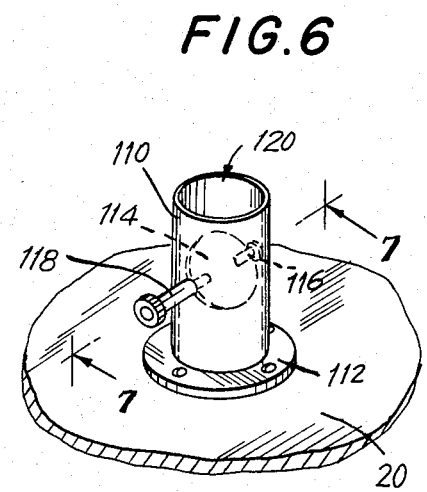
FIG. 6 is a perspective view of the safety aperture.
Figure 7:
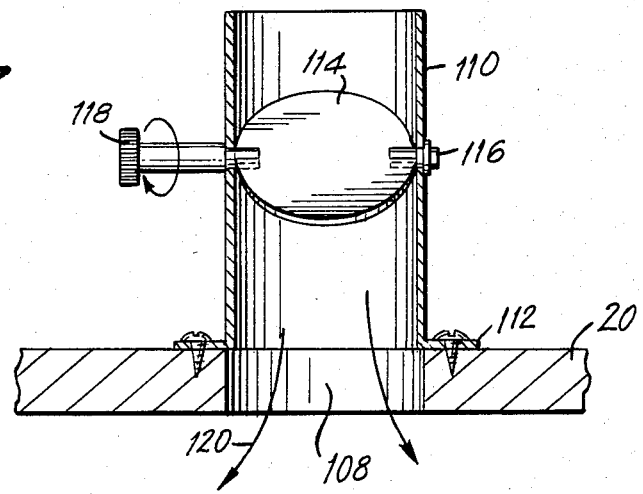
FIG. 7 is a view taken through line 7—7 of FIG. 6.

As seen in FIGS. 1, 5 and 6, a third aperture 108 having a small diameter is formed by top wall 18 spaced from top rim 18. A short cylindrical member, or safety flue, 110 extends upwardly from top wall 18 to which it is attached by a circumferential flange 112 that is aligned around the rim of third aperture 108. Flue 110 acts as a safety inlet for the passage of atmospheric air into compartment 22 in the event bag member 48 is clogged so that no air passes through cloth wall 64 into compartment 22 through top opening 38 of cleaning member 30. Without the presence of safety flue 110 in such a case, a vacuum would be created in compartment 22 and side wall 14 of receptacle member 12, for example, could distort into the vacuum created in compartment 22. Other results detrimental to the equipment or the safety of the operator might occur. A feature that gives the operator some additional control over the air pressure at top opening 38 of cleaning member 30 is shown in FIGS. 5 and 6 where a butterfly valve 114 is rotatably positioned by axle 116 in the passage way of safety flue 110; a control arm 118 is connected to rotatable axle 116 so that the operator may selectively cut off the inlet flow of exhaust air 54 through flue 110 which occurs even when system 10 is operating normally. Thus, air pressure at toroidal ring 88 is increased slightly during the cutoff operation of valve 114. When control arm 118 is released, butterfly valve 114 is pressured to a midstream open position by the flow of inlet air 120 into compartment 22 through flue 110.

It is possible for other types of valves other than butterfly valve 114 to be used for controlling the inflow of air through third aperture 108 into receptacle compartment 22.

It is noted that vacuum bag member 48 can be emptied into another receptacle prior to the placement of bag member 48 in cleaning chamber 32 so that loose debris in receptacle compartment 22 is reduced.

The operator grasps the bottom closed end 70 of bag member 48 at the bottom of cleaning chamber 32 draws the bag member upward so as to make closed end 70 into crown 90 and so create a plurality of toroidal rings 88 through which concentrated currents of air blew out the dirt and debris entrapped in the pores of cloth wall 64. The operator is aware of badly encrusted areas and so can selectively concentrate on creating toroidal rings 88 at those trouble spots by lifting and dropping the bag so as to create strong air currents there. It is noted that a remotely or automatically operated lifting and dropping device could be substituted for the action of the human operator as described herein within the spirit of the invention.

The embodiment of the invention particularly disclosed and described hereinabove is presented merely as an example of the invention. Other embodiments, forms, and modifications of the invention coming within the proper scope and spirit of the appended claims will, of course, readily suggest themselves to those skilled in the art.

What is claimed is:

1. A vacuum bag cleaning system, comprising in combination:
    a substantially rigid receptacle member having a bottom wall and a top rim,
    a substantially horizontal top wall opposing said bottom wall removably and sealably secured to said top rim of said receptacle member, said top wall forming first and second apertures,
    an elongated member forming a cylindrical chamber vertically extending through said first aperture, said elongated member having upper and lower portions respectively extending above and below said top wall, said chamber having opposed top and bottom openings at said upper and lower portions respectively, said bottom opening being spaced from said bottom wall of said receptacle member, said top opening being defined by a circular top opening rim, said member being sealably connected to said top wall at the juncture of said upper and lower portions, said chamber having a substantially vertical axis,
  exhaust means cooperatively mounted at said second aperture and sealably secured to said top wall, said exhaust means being for drawing air from said compartment through said top opening of said chamber and exhausting said air into the atmosphere,
and
  a bag member having a flexible cloth wall permeable to passage of air forming an elongated compartment having a length and having an open end and a closed end at opposed ends of said length, said open end being defined by a circular holding rim adapted to be removably and sealably placed around said top opening rim of said chamber in a mounted relationship, said cloth wall having normal inner and outer surfaces, said bag member being substantially circular in cross-section with a center substantially aligned with said vertical axis of said chamber,
  said bag member being movable in said mounted relationship to a plurality of selected positions in said chamber, wherein in each of said plurality of selected positions said flexible wall of said bag member forms a substantially horizontal toroidal ring around the circumferential portion of said bag member substantially centered on said vertical axis of said chamber, said toroidal ring having a toroidal wall portion disposed downwardly forming an upwardly disposed toroidal recess, whereby air being drawn into said top opening of by said chamber bag said exhaust means is concentratedly drawn through said toroidal wall portion at said plurality of selected positions.

2. A system according to claim 1, wherein said lower portion is approximately twice the length of said upper portion.

3. A system according to claim 1, wherein said elongated member has a cylindrical side wall having an inner cylindrical diameter, and said bag member has an outer diameter when said cloth wall is stiffened under air pressure, said outer diameter and said inner diameter of said cylindrical member being approximately equal, whereby said cloth bag bears upon said side wall of said cylindrical member during operation.

4. A system according to claim 3, wherein said exhaust means includes an exhaust fan operatively connected to a driver, said driver being an electric motor, and a fan housing extending into said compartment at said aperture.

5. A system according to claim 4, wherein said motor is of the order of about 1 to about 2 horsepower.

6. A system according to claim 4, further including a filter means attached to said fan housing for removing particles of dirt in said chamber being moved with the exhaust air through said exhaust fan into the atmosphere.

7. A system according to claim 6, wherein said fan housing includes an inlet portion positioned within said compartment and said filter means includes a folded paper filter cartridge mounted on said inlet side of said fan housing.

8. A system according to claim 7, wherein said filter means further includes a nylon dirt shedding filter having an exhaust opening and an elasticized band positioned around said exhaust opening, said dirt shedding filter being mounted around said filter cartridge at said exhaust opening and said elasticized band.

9. A system according to claim 8, further including safety means formed in said top wall for relieving excess pressure on said side wall of said receptacle member in the event of blockage at said bag member.

10. A system according to claim 9, wherein said aperture means includes a top aperture formed in said third wall and manual control means for controlling the size of said third aperture so that exhaust pressure through said exhaust fan can be controlled to the extent of passage of air from said compartment through said third aperture is controlled.

11. A system according to claim 10, wherein said vertical side wall of said receptacle member is substantially cylindrical.

12. A system according to claim 11, wherein said receptacle member is a 55 gallon steel drum devoid of a drum top wall, said drum having a diameter of approximately $23\frac{3}{4}$ inches.

13. A system according to claim 11, wherein said receptacle member is a 44 gallon receptacle made of a heavy plastic material, said receptacle having a diameter of approximately 24 inches.

14. A system according to claim 13, wherein said 44 gallon receptacle includes wheels affixed to said bottom wall of said receptacle.

* * * * *